(12) United States Patent
Törmälehto (10) Patent No.: US 10,520,313 B2
(45) Date of Patent: Dec. 31, 2019

(54) CONTINUOUS MONITORING OF DRIVE AMPLITUDE IN VIBRATING MICROELECTROMECHANICAL GYROSCOPES

(71) Applicant: MURATA MANUFACTURING CO., LTD., Nagaokakyo-shi, Kyoto (JP)

(72) Inventor: Kimmo Törmälehto, Vantaa (FI)

(73) Assignee: MURATA MANUFACTURING CO., LTD., Nagaokakyo-Shi, Kyoto (JP)

(*) Notice: Subject to any disclaimer, the term of this patent is extended or adjusted under 35 U.S.C. 154(b) by 124 days.

(21) Appl. No.: 15/586,418

(22) Filed: May 4, 2017

(65) Prior Publication Data
US 2017/0343351 A1    Nov. 30, 2017

(30) Foreign Application Priority Data

May 27, 2016    (FI) .................................... 20165446

(51) Int. Cl.
G01C 19/5712    (2012.01)
G01C 19/5726    (2012.01)
G01C 19/5733    (2012.01)

(52) U.S. Cl.
CPC ..... *G01C 19/5712* (2013.01); *G01C 19/5726* (2013.01); *G01C 19/5733* (2013.01)

(58) Field of Classification Search
CPC ................ G01C 19/56; G01C 19/5705; G01C 19/5712; G01C 19/19; G01C 19/26; G01C 19/5776

(Continued)

(56) References Cited

U.S. PATENT DOCUMENTS 8,820,136 B2    9/2014 Donadel et al.
2006/0142958 A1    6/2006 Morell et al.
(Continued)

FOREIGN PATENT DOCUMENTS

EP    2040032 A1    3/2009
JP    2008145338 A    6/2008
(Continued)

OTHER PUBLICATIONS

Finnish Search Report dated Jan. 16, 2017 corresponding to Finnish Patent Application No. 20165446.
(Continued)

*Primary Examiner* — Benjamin R Schmitt
(74) *Attorney, Agent, or Firm* — Squire Patton Boggs (US) LLP (57) ABSTRACT

The disclosure relates to a microelectromechanical gyroscope comprising at least one mass element, a drive actuator and sense electrodes. The at least one mass element is configured to be driven by the drive actuator into oscillating movement with a drive oscillation frequency $\omega_D$, and the sense electrodes are configured to produce a sense signal from the oscillating movement of the at least one mass element. The gyroscope control circuit comprises an amplitude detection unit which detects a sense signal amplitude at the frequency $2\omega_D$. This amplitude yields a measure of drive oscillation amplitude. Amplitude detection at the frequency $\omega_D$ yields a measure of angular rotation rate.

17 Claims, 8 Drawing Sheets

(58) Field of Classification Search
USPC .......................................... 73/504.02, 504.12
See application file for complete search history.

(56) References Cited

U.S. PATENT DOCUMENTS

| | | | |
|---|---|---|---|
| 2010/0251800 A1* | 10/2010 | Mueck | G01P 15/125 73/1.38 |
| 2013/0233048 A1 | 9/2013 | Anac et al. | |
| 2013/0283908 A1 | 10/2013 | Geen et al. | |
| 2015/0211853 A1 | 7/2015 | Anac et al. | |

FOREIGN PATENT DOCUMENTS

| | | |
|---|---|---|
| JP | 2014238317 A | 12/2014 |
| JP | 2015222246 A | 12/2015 |
| TW | I453371 B | 9/2014 |
| WO | WO 2009/037499 A1 | 3/2009 |

OTHER PUBLICATIONS

Oct. 25, 2017 Search Report issued in European Patent Application No. 17171295.
Taiwanese Search Report application No. 106114478 dated Oct. 14, 2017.

* cited by examiner

CONTINUOUS MONITORING OF DRIVE AMPLITUDE IN VIBRATING MICROELECTROMECHANICAL GYROSCOPES

BACKGROUND

Field

The present invention relates to vibrating microelectromechanical (MEMS) gyroscopes and to continuous monitoring of their operation.

Brief Description of the Related Art

Figure 1:
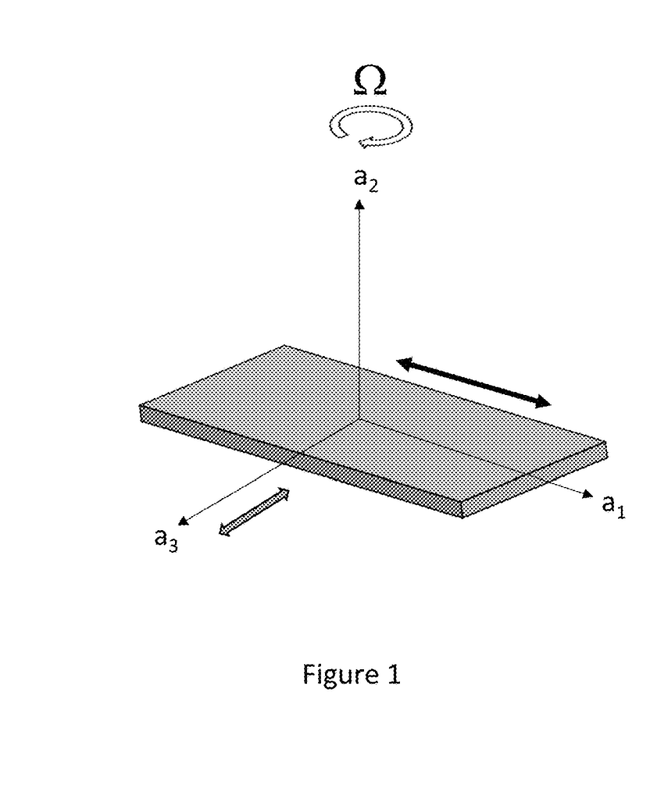
FIG. 1 illustrates the general operating principle of a MEMS gyroscope where the mass is actuated in linear oscillation.
Figure 2:
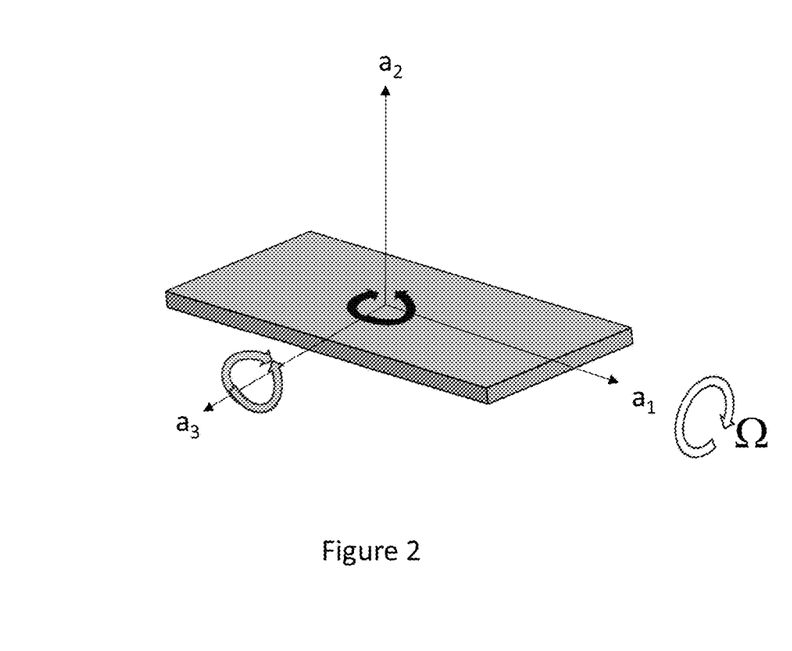
FIG. 2 illustrates the general operating principle of a MEMS gyroscope where the mass is actuated in rotational oscillation.

MEMS gyroscopes use the Coriolis Effect to measure angular velocity. In a vibrating MEMS gyroscope a mass element is driven into oscillating movement by an actuating drive force. This oscillation will be called "drive oscillation" in this disclosure and it can be either linear or rotational. FIG. 1 illustrates a mass driven in linear oscillation along its primary axis $a_1$, while FIG. 2 illustrates a mass driven in rotational oscillation about its primary axis $a_2$. The drive oscillation is indicated with a solid black arrow in both figures. The actuating drive force can be generated, for example, with an electrostatic, magnetic or piezoelectric actuator.

A microelectromechanical gyroscope may comprise a reference frame to which one or more mass elements are connected with spring structures which allow the mass element to move with at least two degrees of freedom. The reference frame typically surrounds the mass elements. The reference frame and the mass elements are typically configured for electrical measurements in relation to each other. The mass element can oscillate within the plane defined by the reference frame or out of the plane defined by the reference frame.

When the gyroscope containing a mass element in drive oscillation undergoes an angular rotation rate $\Omega$ about a secondary axis which is not parallel to the primary axis, the mass element is affected by the Coriolis force. The Coriolis force is determined by the magnitude and direction of the angular rotation rate vector and the mass element velocity vector. A mass element in drive oscillation will undergo an oscillating Coriolis force. This force oscillates the mass element along or about a secondary axis perpendicular to the primary axis. Oscillation along or about the secondary axis will be called "sense oscillation" in this disclosure.

In FIGS. 1 and 2 the angular rotation rate $\Omega$ is indicated with a white arrow and the sense oscillation is indicated with a grey arrow. The sense oscillation is a linear oscillation along axis $a_3$ in FIG. 1 and a rotational oscillation about axis $a_3$ in FIG. 2. In other words, the secondary axis is $a_3$ in both FIGS. 1 and 2. The sense oscillation may be detected through capacitive, piezoelectric or piezoresistive sensing in relation to a fixed reference frame. The electric signal arising from this detection will be called the "sense signal" in this disclosure.

In this disclosure the term "sense oscillation amplitude" means the maximum extent that a mass element in the gyroscope is displaced from its rest position as it undergoes sense oscillation. The term "drive oscillation amplitude" means the maximum extent that a mass element in the gyroscope is displaced from its rest position as it undergoes drive oscillation. Both the sense oscillation amplitude and the drive oscillation amplitude can be either linear distances or angles, as is evident from FIGS. 1 and 2.

Correspondingly, in this disclosure the terms "sense oscillation frequency" and "drive oscillation frequency" mean the frequency at which a mass element oscillates in sense oscillation and drive oscillation, respectively. The symbol $\omega_D$ represents the drive oscillation frequency in this disclosure. The frame, the mass element and the springs may be designed so that the sense oscillation frequency assumes a value which is equal or very close to the drive oscillation frequency.

Several mass elements can be driven with one drive actuator. The drive motion is transmitted simultaneously to all mass elements. Simultaneous capacitive monitoring of several mass elements facilitates measurement of various differential capacitances. Differential capacitance measurements are less noisy than single-sided measurements because they allow the sense oscillation (which arises from the angular rate) to be more clearly separated from additional capacitive signals (which can arise from other vibrations or accelerations). One way to achieve a clear separation is to drive the mass elements in opposite phases (by, for example, driving one mass in the positive direction along the $a_1$-axis when another moves in the negative direction, and vice versa). The sense oscillation of these mass elements will then also be in opposite phase (one mass will move in the positive direction along the $a_3$-axis when the other moves in the negative direction, and vice versa). This differential-mode sense oscillation (arising from the angular rate) can be clearly distinguished from common-mode motion (arising from other vibrations or accelerations) where both masses move in the same direction along the $a_3$-axis.

An additional benefit of several mass elements is that an oscillating internal angular momentum (arising from the drive motion) about the center of the gyroscope is avoided when several mass elements are positioned symmetrically around the center and set to oscillate in a suitable phase.

Figure 3:
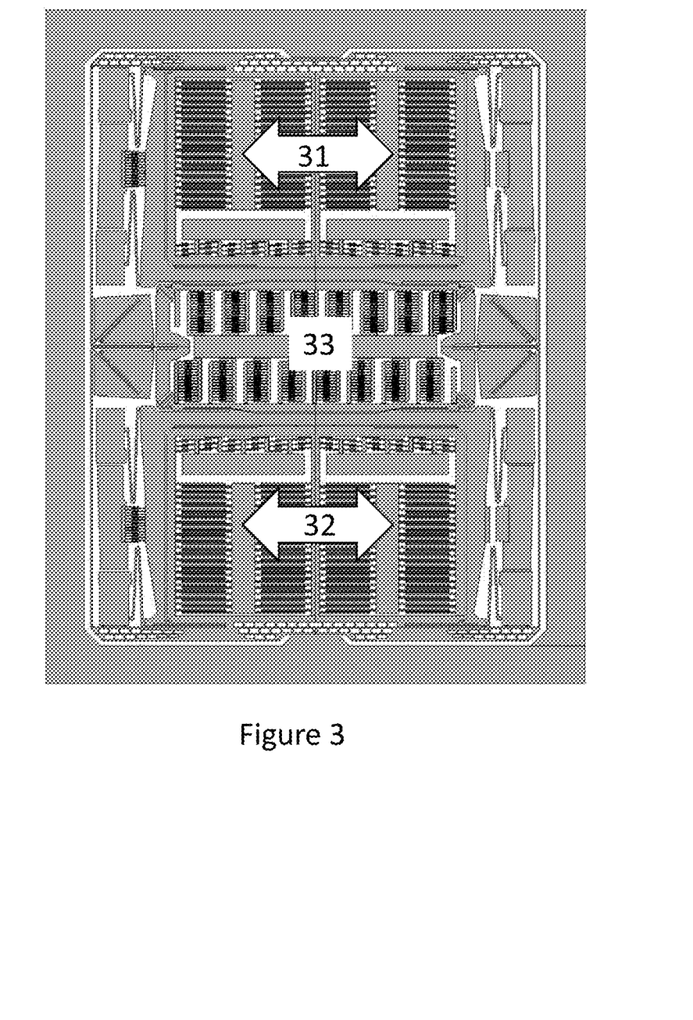
FIG. 3 illustrates a MEMS gyroscope where a where two mass elements are actuated in linear oscillation.
Figure 4:
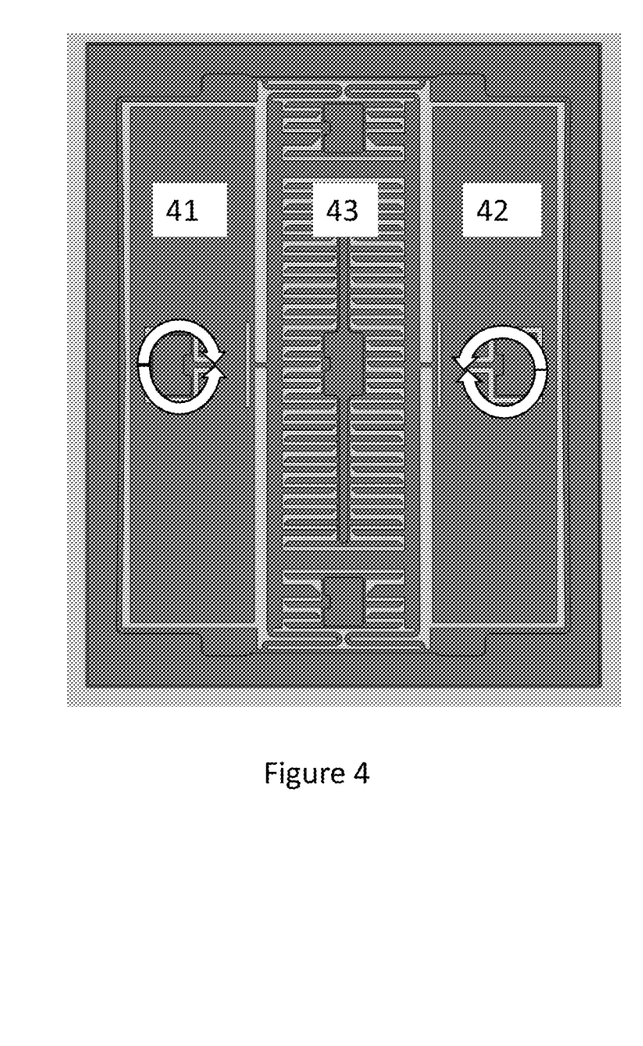
FIG. 4 illustrates a MEMS gyroscope where two mass elements are actuated in rotational oscillation.

FIG. 3 illustrates a MEMS gyroscope where centrally located drive actuator 33 actuates a linear drive oscillation in two adjacent mass elements 31 and 32. FIG. 4 illustrates a MEMS gyroscope where the centrally located drive actuator 43 actuates a rotational drive oscillation in two adjacent mass elements 41 and 42. In both gyroscopes the two mass elements are typically driven to oscillate in anti-phase, so that when 31 moves left, 32 moves right, and when 41 rotates clockwise, 42 rotates counter-clockwise.

The drive actuator may be, for example, a capacitive comb drive where an oscillating electrostatic force is generated between adjacent comb electrodes by connecting them to an oscillating drive voltage. This oscillating voltage will be called the drive signal in this disclosure. The drive signal has a drive signal amplitude and a drive signal frequency. The drive oscillation frequency $\omega_D$ follows the drive signal frequency because the drive signal frequency is transmitted by the actuator directly to the mass element. Correspondingly, the drive signal amplitude determines the drive oscillation amplitude. In other words, the value of the drive oscillation frequency can be changed by adjusting the drive signal frequency and the value of the drive oscillation amplitude can be changed by adjusting the drive signal amplitude. The drive signal frequency is usually set to a value which is equal or very close to the resonance frequency of the mass element in drive motion to maximize the oscillation amplitude by the resonance gain.

While the drive oscillation is set by the drive signal in the manner described above, the sense oscillation is a more complicated movement. One component of the oscillation is determined by the drive oscillation amplitude and by the strength of the Coriolis force. The sense oscillation may have other components as well, as will be described in the detailed description of this disclosure. One objective in gyroscope design may be to keep the drive oscillation amplitude as constant as possible. An unintended and undetected change in drive oscillation amplitude would change the sensitivity of the gyroscope and produce erroneous measurement results.

There are many reasons why the drive oscillation amplitude may not remain exactly constant for long periods of time. Temperature is one important factor because thermal expansion may alter the mechanics of drive oscillation. A temperature change also influences the dynamic pressure exerted by the surrounding gas on the moving mass elements. The drive signal voltage may therefore have to be increased or decreased to maintain the same drive oscillation amplitude as the temperature changes.

The drive oscillation amplitude may also be deliberately changed based on temperature input, to keep the sensitivity of the gyroscope constant as the temperature changes. The extent of this temperature correction has to be determined beforehand in a temperature calibration procedure. This drive oscillation amplitude adjustment can be used either as a complement or as an alternative to numerical temperature corrections, where the measurement result is scaled with temperature correction factors.

Drive oscillation mechanics may also change due to various unexpected faults during operation. Production defects or mechanical wear in the active parts of the gyroscope or the bonds between them can affect its operation either gradually and suddenly. Vibrating microelectromechanical gyroscopes are therefore commonly equipped with a measurement arrangement for monitoring the drive oscillation amplitude. Such an arrangement is also required for the temperature calibration procedure mentioned above.

By continuously measuring its own drive oscillation amplitude and frequency, a vibrating microelectromechanical gyroscope can be programmed to automatically adjust the drive signal, either to compensate for an unexpected amplitude change or to perform a temperature correction. The gyroscope can also report its own malfunction to an external circuit in case disturbances in drive oscillation amplitude are too severe to be compensated.

Document U.S. Pat. No. 8,820,136 B2 discloses a microelectromechanical gyroscope with self-test capability. A mass element is driven in linear oscillation along the drive axis X. The mass element is also movable in the direction of an orthogonal sense axis Y. A self-test functionality is implemented with dedicated self-test electrodes on the mass element and the fixed frame. An oscillating drive signal is converted into an oscillating self-test signal with a lower self-test frequency than the drive oscillation. This self-test signal produces an oscillating force which acts on the mass element in the Y-direction. The signal measured from the movement of the mass element in the Y-direction is then continuously demodulated at the drive oscillation frequency to measure the influence of the Coriolis Effect. It is also demodulated at the self-test frequency to monitor if the gyroscope is still working properly. The problem with this prior art solution is that it requires separate self-test excitation electronics and a separate self-test excitation actuator. A gyroscope with this self-test functionality therefore requires more chip area and consumes more current than a gyroscope without self-test functionality. The additional excitation electronics and actuator also introduce additional complexity and a potential source of measurement error.

Document US20150211853 A1 also discloses a microelectromechanical gyroscope with self-test capability. In this document a linear drive actuator creates a rotational oscillation in the sense mass. The self-test functionality is implemented by including separate sensing electrodes for continuously monitoring the drive oscillation. The problem with this solution is that additional electrodes and circuitry have to be introduced for monitoring the drive oscillation. Furthermore, there is a risk of crosstalk between the drive signal and the drive monitoring signal, which increases the risk of measurement errors.

SUMMARY

An object of the present disclosure is to provide a microelectromechanical gyroscope and an associated method to overcome or at least alleviate the above problems in the prior art. The objects of the disclosure are achieved by an arrangement and method which are characterized by what is stated in the independent claims. The preferred embodiments of the disclosure are disclosed in the dependent claims. The disclosure is based on the idea of utilizing the sense signal for both angular rotation rate measurements and for drive oscillation amplitude monitoring.

BRIEF DESCRIPTION OF THE DRAWINGS

In the following the disclosure will be described in greater detail by means of preferred embodiments with reference to the accompanying drawings, in which.

DETAILED DESCRIPTION

As is known from the prior art, angular rotation rate can be detected in vibrational gyroscopes by demodulating the sense signal at the drive oscillation frequency $\omega_D$. The idea presented in this disclosure is that drive oscillation amplitude may be monitored by demodulating the same sense signal at double the drive oscillation frequency, in other words $2\omega_D$. As mentioned before, the drive oscillation frequency $\omega_D$ is a resonance frequency, so the double frequency will be labelled the second harmonic frequency in this disclosure.

A sense signal component which is periodic at the second harmonic frequency is generated with the exemplary gyroscope structures presented below. The general idea is to construct the gyroscope in such a way that the sensed electric quantity exhibits two purely drive-dependent maxima in each drive oscillation period. In other words, the gyroscope is configured to continuously produce a sense signal component which is completely independent of the Coriolis Effect and easily distinguishable from Coriolis-induced sense signal components because it oscillates at the second harmonic frequency. The sense-signal component induced by the Coriolis Effect normally oscillates at the drive oscillation (resonance) frequency $\omega_D$, as mentioned above.

In the disclosed apparatus, the sense signal therefore has at least two components. The first component is caused by the Coriolis Effect and its frequency is the resonance frequency $\omega_D$. The second component, induced by drive oscillation movement, is caused by the structural properties described under Exemplary Gyroscopes below. Its frequency is the second harmonic frequency $2\omega_D$. The amplitude of the first component will be labelled the Coriolis amplitude and the amplitude of the second component will be labelled the second harmonic amplitude. The term "sense signal amplitude" will be used to refer to any amplitude determined from the sense signal, including both the Coriolis amplitude and the second harmonic amplitude.

This disclosure describes a method for operating a microelectromechanical gyroscope comprising at least one mass element, a gyroscope control circuit, and a drive actuator controlled by a drive signal comprising a drive signal amplitude and a drive signal frequency. In the method, the at least one mass element is driven by the drive actuator into oscillating movement with a drive oscillation frequency $\omega_D$. A sense signal is produced from the oscillating movement of the at least one mass element, and a sense signal amplitude is detected at the frequency $2\omega_D$ in the gyroscope control circuit.

An advantage of the arrangement and method of this disclosure is that drive oscillation amplitude can be monitored and adjusted using only the sense equipment (sense electrodes and sense circuitry) which is already in place for sensing the impact of the Coriolis force. Additional measurement electrodes dedicated specifically to drive oscillation monitoring and electric circuitry for reading these drive oscillation measurements are not required. A separate drive actuator for inducing self-test sense oscillations is not required, either.

Continuous drive oscillation amplitude adjustment and self-testing can thereby be performed in MEMS gyroscopes with lower current consumption, smaller area and simpler circuitry than in corresponding solutions known from the prior art. The number of potential sources of measurement error is reduced. Furthermore, prior art solutions which employ separate drive oscillation measurement circuitry often exhibit crosstalk between the drive signal and the drive oscillation measurement signal. In the arrangement and method of this disclosure this crosstalk is eliminated because the drive oscillation is monitored at a frequency which differs from the drive signal frequency.

Figure 5:
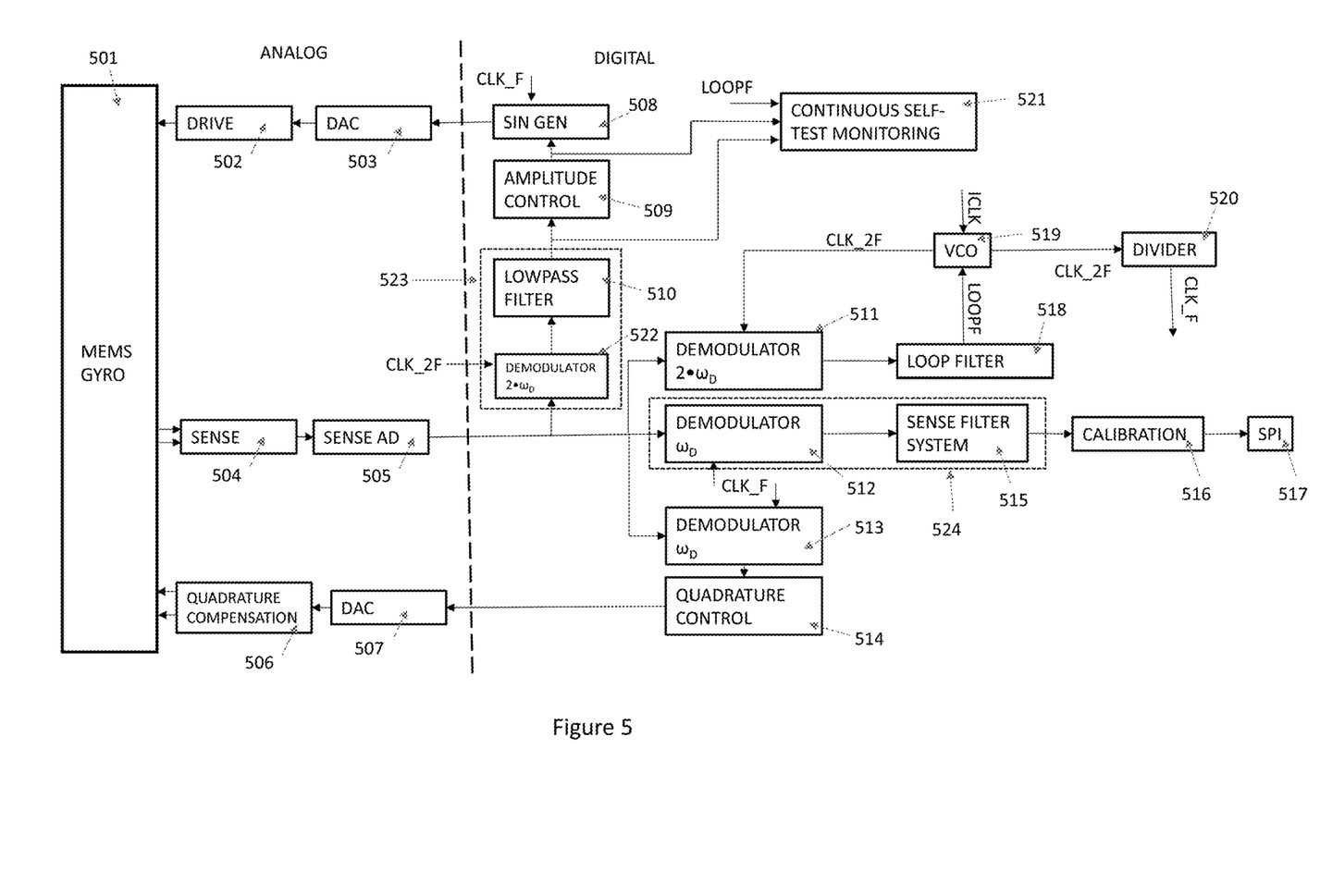
FIG. 5 illustrates a gyroscope control circuit for performing the measurement and monitoring functions described in this disclosure.

FIG. 5 shows an example of a gyroscope control circuit according to this disclosure. The gyroscope control circuit monitors the drive oscillation amplitude continuously and adjusts this amplitude if necessary. The sense oscillation of the MEMS gyroscope 501 may be measured with sensors 504. These sensors can be either capacitive or piezoelectric. The sensor signal can be amplified and converted into a digital signal in analog-to-digital converter 505. This amplified signal can then be demodulated by two demodulators 512, 513 at the drive oscillation frequency $\omega_D$ and by two demodulators 511, 522 at the second harmonic frequency $2\omega_D$. Each demodulator pair 512+513 and 511+522 can in some embodiments be replaced with only one demodulator operating at said frequency. Demodulator 513 may not be included if gyroscope 501 does not require quadrature compensation.

Demodulator 511, Loop Filter 518 and voltage-controlled oscillator (VCO) 519 form a phase-locked loop. The VCO 519 can receive an initial clock signal (ICLK) from a clock generator and generates a first periodic clock signal (CLK_2F) which is fed to demodulator 511. Demodulator 511 comprises a phase detector which compares the phase of CLK_2F to the phase of the incoming sense signal. The first clock signal CLK_2F can then be adjusted through Loop Filter 518 until its phase matches that of the sense signal. The first clock signal CLK_2F can then be fed from the VCO to a frequency divider 520 which generates a second clock signal CLK_F at half the frequency of CLK_2F.

Two clock signals CLK_F are fed to demodulators 512 and 513. Demodulator 512 demodulates the sense signal at the frequency determined by CLK_F and feeds the sense signal to a filter system 515 and a calibration unit 516, where rate offset and temperature-dependent sensitivity corrections may be applied, and to serial peripheral interface (SPI) 517. Together demodulator 512 and filter system 515 constitute a amplitude detection unit 524. This detection unit detects the Coriolis amplitude. Demodulator 512 operates at half the frequency of demodulator 511 because the first clock signal CLK_2F was halved in frequency divider 520. Alternatively, amplitude detection unit 524 could comprise a bandpass filter operating at the frequency CLK_F and a peak detector for detecting the corresponding sense signal amplitude, or other means for extracting the Coriolis amplitude from the sense signal.

The gyroscope control circuit may perform quadrature compensation. The clock signal CLK_F which is fed to demodulator 513 is in this case phase-shifted by 90° in relation to the clock signal fed to demodulator 512, because the quadrature signal is orthogonal to the signal induced by the Coriolis force. Demodulator 513 demodulates the sense signal at the frequency determined by CLK_F and feeds the measurement signal to quadrature compensation control unit 514, which sends a signal to compensation electrodes 506. This quadrature control path can be omitted if gyroscope 501 does not require quadrature compensation.

The second harmonic amplitude is detected in amplitude detection unit 523. In the embodiment shown in FIG. 5, amplitude detection unit 523 comprises a demodulator 522 which demodulates the sense signal at the frequency CLK_2F which was set in the phase-locked loop 511-518-519. In FIG. 5 amplitude detection unit 523 also comprises a lowpass filter 510 for removing ripple from the higher order harmonics. Alternatively, amplitude detection unit 523 could comprise a bandpass filter operating at the frequency CLK_2F and a peak detector for detecting the corresponding sense signal amplitude, or other means for extracting the second harmonic amplitude from the sense signal.

The detected second harmonic amplitude can be fed to amplitude control unit 509, which comprises an amplitude comparison circuit which compares the measured second harmonic amplitude to a reference value. The difference between the two is fed to a controller circuit, which is typically implemented with a proportional integral scheme (PI-controller), where an adjusted drive signal amplitude is calculated.

The reference value may be a value selected before the device was put into operation, an earlier measurement result obtained after the device was put into operation, or a combination of an initial fixed value and an earlier measurement result. It is typically selected in a calibration procedure in the production process and stored in nonvolatile memory).

Based on the amplitude comparison the amplitude control unit 509 instructs drive signal generator 508 set the drive signal amplitude to its adjusted value. Amplitude control unit 509 can either control the amplitude of the sinusoidal excitation (running at CLK_F) or preferably the average (DC) value of the drive voltage. The drive signal can then be fed through a digital-to-analog converter (DAC) 503 to the drive actuator 502 and the drive oscillation amplitude thereby assumes a new, adjusted value. The value of the drive oscillation amplitude may be maintained within a predetermined interval, so that an adjustment is performed only when the measured drive oscillation amplitude lies outside of this interval.

Both the detected second harmonic amplitude and the adjusted drive signal amplitude can be fed to a self-test monitoring unit 521, which comprises digital tolerance check circuitry. The frequency LOOPF from Loop Filter 518 can also be fed to self-test monitoring unit 521. The self-test monitoring unit continuously reads the second harmonic amplitude, the adjusted drive signal amplitude and the drive oscillation frequency. If any of these values fall beyond their preset self-test allowance margins, the monitoring unit reports a failed self-test to an external circuit so that the use of this particular gyroscope component can be discontinued.

With reference to FIG. 5, the advantages of the apparatus and method of the present disclosure may be explained in more detail. Firstly, no additional excitation circuitry or excitation actuator dedicated exclusively to self-test purposes are required. The gyroscope can execute its continuous self-testing function using only the actuation unit it already possesses for actuating its normal drive oscillation and only the sensors it already possesses for measuring the sense oscillation.

The apparatus and method of this disclosure therefore achieve the same objective as a self-test arrangement with separate measurement electrodes for detecting the drive oscillation amplitude, while using less device area and simpler circuitry. A separate sensor for detecting drive oscillation amplitude would require an additional preamplifier and an additional AD-converter for this signal. The apparatus and method of the present disclosure instead retrieve information about both the sense oscillation amplitude and the drive oscillation amplitude from one sense signal. The sense oscillation amplitude is retrieved through demodulation at the drive resonance frequency $\omega_D$, while the drive oscillation amplitude is retrieved at the second harmonic frequency $2\omega_D$. These two overlapping sense signal components oscillating at different frequencies can easily and reliably be distinguished from each other.

The apparatus and method of this disclosure can also be used to detect other faults, such as changes in amplifier gain or a failed wirebond which shuts off one part of the sense signal entirely. Both of these latent process defects can reduce the detected sense signal amplitudes.

Exemplary Gyroscopes

The apparatus and method of this disclosure can be implemented with many MEMS gyroscope structures. In the following two examples, a first gyroscope structure with a linearly oscillating mass element and a second gyroscope structure with a rotationally oscillating mass element will be described in detail. The purpose of these examples is to explain the origin of the sense signal component which oscillates at the second harmonic frequency. These exemplary gyroscopes utilize capacitive detection, but piezoelectric detection is also possible in some embodiments.

In each example, the microelectromechanical gyroscope comprises at least one mass element, a drive actuator, sense electrodes, and a gyroscope control circuit. The drive actuator is configured to be controlled by a drive signal comprising a drive signal amplitude and a drive signal frequency. The at least one mass element is configured to be driven by the drive actuator into oscillating movement with a drive oscillation frequency $\omega_D$. The sense electrodes are configured to produce a sense signal from the oscillating movement of the at least one mass element, and the gyroscope control circuit comprises an amplitude detection unit which detects a sense signal amplitude at the frequency $2\omega_D$.

EXAMPLE 1

FIGS. 6a-6e illustrate the working principle of a first exemplary gyroscope structure. The gyroscope is of the kind illustrated in FIG. 3, where two mass elements are driven in linear oscillation. The drive oscillation frequency $\omega_D$ may, for example, be 8 kHz in gyroscopes of this kind. The second harmonic frequency would then be 16 kHz.

When this gyroscope undergoes angular rotation the Coriolis force actuates a linear translation perpendicular to the drive oscillation, as FIG. 1 illustrates. The axes shown in FIG. 1 are also indicated in FIGS. 6a-6e.

Figure 6A:
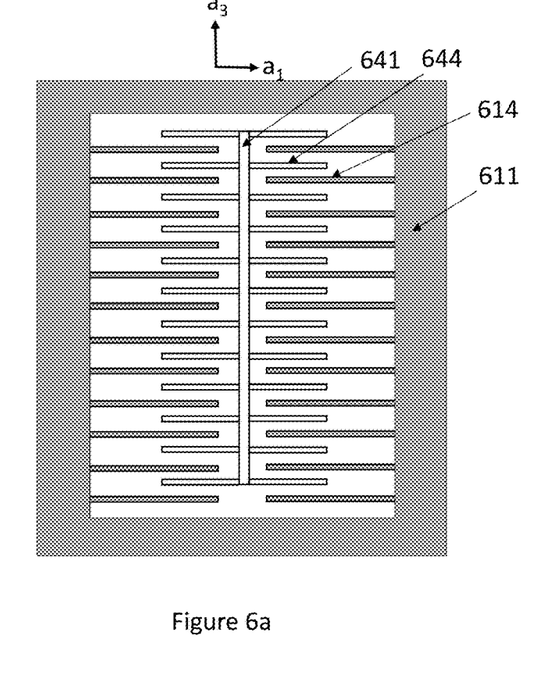
FIGS. 6a-6e illustrate a first exemplary gyroscope.

FIG. 6a shows a mass element 611 with sense finger electrodes 614 surrounding a fixed center electrode 641 with fixed finger electrodes 644. The term "sense electrodes" in this disclosure covers both sense finger electrodes and fixed finger electrodes. The mass element 611 is suspended from springs (not shown) attached to a frame (not shown). The fixed center electrode 641 and fixed finger electrodes 644 are fixed to the frame. The mass element 611 is movable in relation to the frame along both the direction of the $a_1$-axis and the $a_3$-axis. The gyroscope control circuit measures the differential capacitance between all fixed finger electrodes 644 and all sense finger electrodes 614. Multiple finger electrodes are used to improve measurement accuracy.

The drive oscillation moves the mass element 611 back and forth along the direction of the $a_1$-axis. This linear translation has no effect on the measured differential capacitance because when mass element 611 moves to the left, the a real overlap between the sense finger electrodes 614 and fixed finger electrodes 644 on the left side of the fixed center is reduced, but the corresponding overlap increases on the right by the exact same amount. The net effect of drive oscillation along the $a_1$-axis on the sensed capacitance is therefore zero. The Coriolis force induces a periodic oscillation along the $a_3$-axis at the drive oscillation frequency. This produces a measurable change in differential capacitance.

Figure 6B:
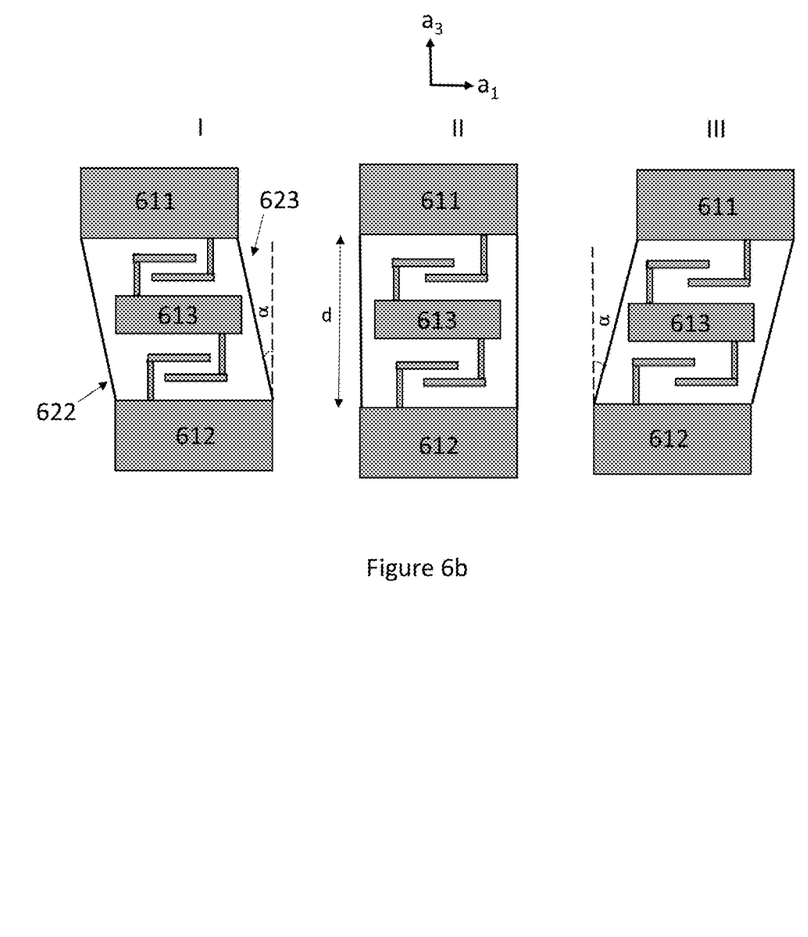

FIG. 6b shows an example of how the apparatus and method of this disclosure can be implemented. The gyroscope comprises two mass elements 611 and 612 driven into linear oscillation along the $a_1$-axis by a central drive actuator 613. The drive actuator 613 is attached to a frame and the drive motion is actuated capacitively. Finger electrodes which actuate the drive motion are indicated schematically by one finger on each side of drive actuator 613. Sense finger electrodes on the mass elements 611 and 612 have been omitted for clarity.

The two mass elements 611 and 612 are physically coupled to each other with two levers 622 and 623 to the left and right of the drive actuator 613. As already mentioned earlier, drive actuator 613 actuates the two mass elements 611 and 612 in anti-phase, so that 611 moves to the left when 612 moves to the right and vice versa. The range of lateral movement has been greatly exaggerated in FIG. 6b clarity.

Figure 6C:
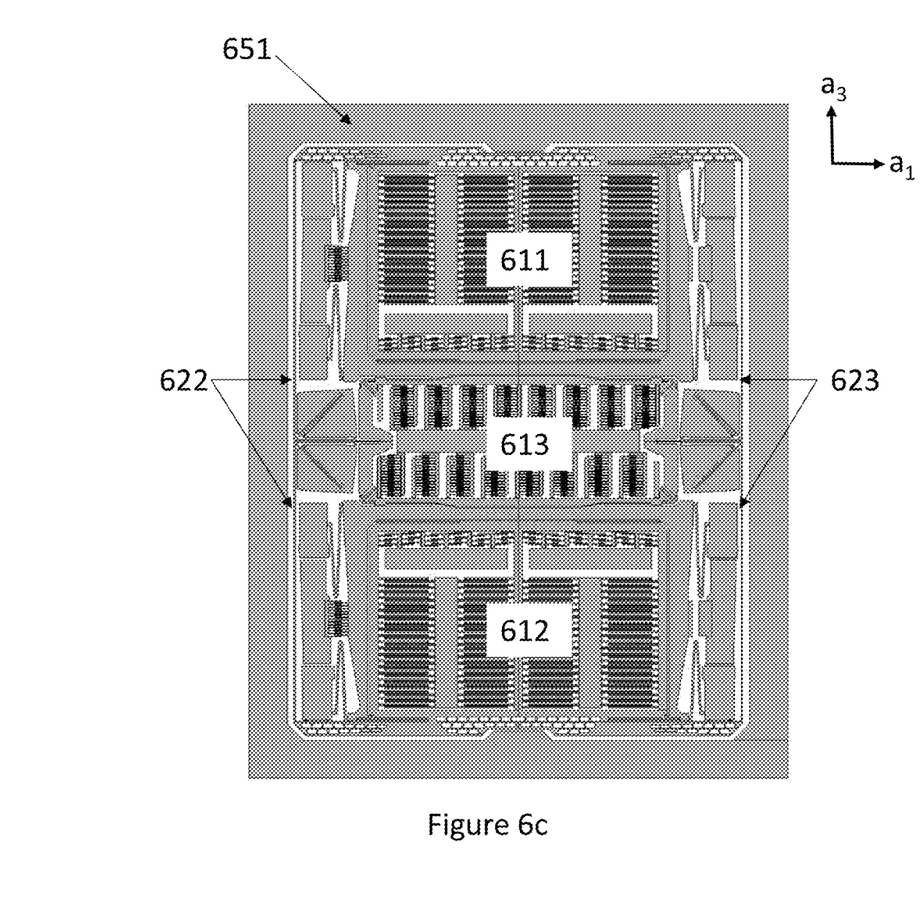

FIG. 6c shows the actual positions of levers 622 and 623 in a gyroscope with two mass elements 611, 612 and a drive actuator 613. As seen in FIG. 6c, levers 622 and 623 extend parallel to frame 651 on both sides of the gyroscope and are attached to the top corners of mass elements 611 and the bottom corners of mass element 612. The levers 622 and 623 may not be entirely rigid. They can serve additional purposes besides generating a second harmonic component in the sense signal. When mass elements 611 and 612 are coupled to each other their common-mode resonance frequency along the $a_3$-axis becomes larger than the differential-mode resonance frequency. This makes it easier to separate the sense oscillation from other capacitive signals, as explained in the background section of this application. The levers 622 and 623 must in this case be so flexible that the differential mode, where 611 and 612 move in opposite directions, is not suppressed. Further details on the other functions of levers 622 and 623 can be found in prior art document WO2012120190.

Levers 622 and 623 are sufficiently rigid to implement the apparatus and method of this disclosure through the working principle illustrated in FIG. 6b. This figure shows a sequence I-II-III in the drive oscillation cycle. A complete oscillation period corresponds to the cycle II-I-II-III-II. When the first mass element 611 is driven to the left and the second mass element 612 to the right in position I, the levers 622 and 623 tilt to the left in an angle α. The levers 622 and 623 then tilt to the right in the same tilt angle a in position III.

Consequently, if the distance between the mass elements 611 and 612 is d in position II, the distance between them is d·cos α in positions I and III. In other words, the levers 622 and 623 pull the two mass elements slightly closer to each other in the direction of the $a_3$-axis in positions I and III. Due to this pulling action, every point on the mass element moves along a slightly curved line in the drive oscillation period II-I-II-III-II, as illustrated at the bottom of FIG. 6b. In addition to their primary linear oscillation, i.e. the normal drive oscillation along the $a_1$-axis, the two mass elements 611 and 612 will therefore also exhibit a secondary linear oscillation along the $a_3$-axis. This secondary linear oscillation has a small amplitude because the angle a is small, but the amplitude is sufficient to cause a measurable sense signal component.

It is significant that this secondary linear oscillation of mass elements 611 and 612 exhibits two distance maxima and two distance minima in one complete drive oscillation period because they pass the central position II twice. Consequently, since the drive oscillation frequency is $\omega_D$, the secondary linear oscillation will obtain the second harmonic frequency $2\omega_D$. The sense signal arising from secondary linear oscillation is therefore readily separable from the signal arising from the Coriolis Effect with the apparatus and method of this disclosure.

Figure 6D:
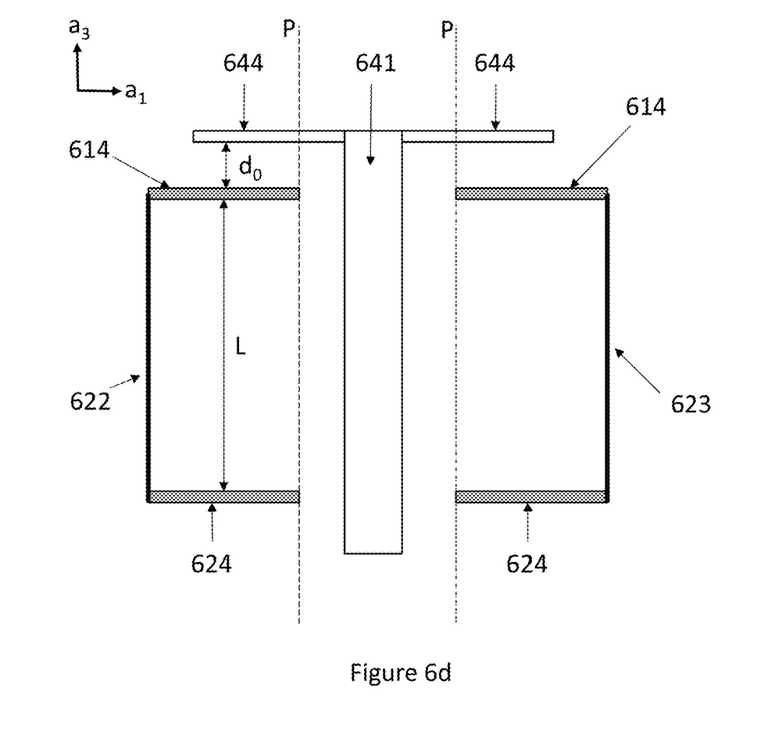

FIG. 6d presents the geometry of this exemplary gyroscope structure in more detail. This figure shows a portion of the fixed center electrode 641 and one fixed finger electrode 644 on each side of the electrode center 641. To preserve clarity the mass elements 611 and 612 are represented simply by two pairs of sense finger electrodes 614 and 624, and only one pair of fixed finger electrodes 644 is shown.

The levers 622 and 623 connect mass element 611 to mass element 612, as shown in FIG. 6b. The mass elements are in the central position II in FIG. 6d, where levers 622 and 623 are perpendicular to the sense finger electrodes 614 and 624. The length of each lever is L and the distance between finger electrodes 614 and 644 is $d_o$ in this position, as shown in the figure. The initial position of the sense finger electrodes 614 on the $a_1$-axis in relation to the fixed finger electrodes 644 is indicated by the dotted lines P.

Figure 6E:
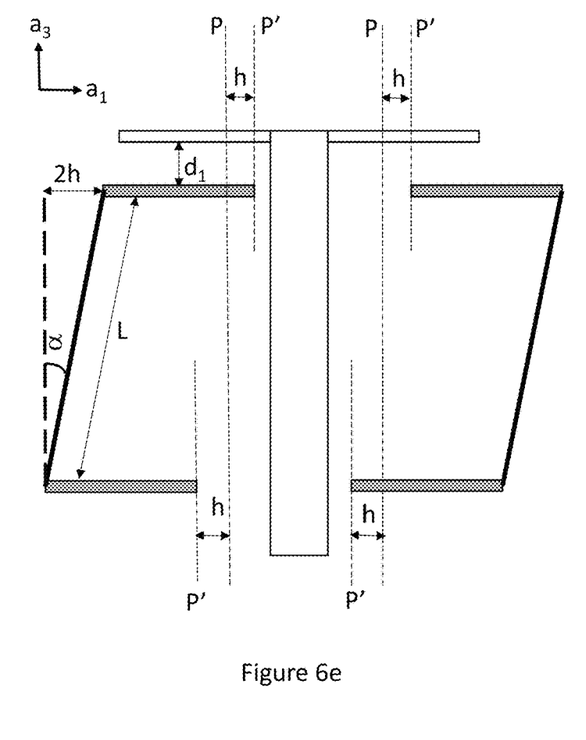

FIG. 6e shows the same gyroscope geometry in position III when the levers have tilted by an angle α to the right due to the drive motion of the mass elements. All components shown in FIG. 6e correspond to the ones shown in FIG. 6d but reference numbers have been omitted for clarity. The position of the sense finger electrodes 614 on the $a_1$-axis in relation to the fixed finger electrodes 644 in position III is indicated by the dotted lines P'. It can be seen that the two sense finger electrodes 614 have moved the distance h to the right, while the opposing sense finger electrodes 624 have moved the same distance h to the left. The distance h can be interpreted as the drive oscillation amplitude because the mass element 611 has moved to its rightmost extremity and mass element 612 to its leftmost extremity in position III.

For the reasons explained above, while moving a distance h along the $a_1$-axis, sense finger electrodes 614 and 624 have moved further away from their respective fixed finger electrodes 644 along the $a_3$-axis. Remembering that the same displacement takes place on both sides, it follows directly from the geometry of FIGS. 6d and 6e that $$d_1 - d_0 = \frac{1}{2}(L - L\cos\alpha) \tag{1}$$

and $$4h^2 + L^2(\cos\alpha)^2 = L^2$$

$$\Rightarrow \cos\alpha = \sqrt{1 - 4\frac{h^2}{L^2}} \tag{2}$$

Let ΔC denote the amount by which the capacitance between one pair of fixed finger electrodes 644 and one pair of sense finger electrodes 614 changes when the mass element moves from position II (shown in FIG. 6d) to position III (shown in FIG. 6e). ΔC can be written as a function of h:

$$\Delta C(h) = C_0 - C_1 = \frac{\varepsilon A}{d_0} - \frac{\varepsilon A}{d_1} = \varepsilon A \left( \frac{1}{d_0} - \frac{1}{d_0 + \frac{1}{2}L(1 - \cos\alpha)} \right) = \varepsilon A \left( \frac{1}{d_0} - \frac{1}{d_0 + \frac{1}{2}L\left(1 - \sqrt{1 - \frac{4h^2}{L^2}}\right)} \right) \tag{3}$$

where $C_0$ is the capacitance in position II, $C_1$ is the capacitance in position III, ε is the permittivity and A is the overlap area between the sense finger electrode and the fixed finger electrode. The area remains constant in drive oscillation movement, as explained above.

The displacement h is very small. The function ΔC(h) can therefore be approximated by a Taylor series around h=0, which yields the result $$\Delta C(h) \sim h^2 \tag{4}$$

The calculation is identical for every finger electrode pair. The capacitive sense signal measured from the mass elements will therefore exhibit a periodic component whose amplitude is proportional to the square of the drive oscillation amplitude h. This amplitude is the second harmonic amplitude. The exact value of the proportionality coefficient will depend on the number of finger electrode pairs and their dimensions, as well as on the distances L and $d_0$. It can be determined by a person skilled in the art.

The important thing to note is that the second harmonic amplitude of the sense signal can be used to continuously monitor the drive oscillation amplitude h. Furthermore, the second harmonic amplitude is a very sensitive indicator of changes in drive oscillation amplitude because its value is proportional to the drive oscillation amplitude squared.

Once the second harmonic amplitude has been determined, the corresponding (measured) drive oscillation amplitude can be calculated. If the reference value for the drive oscillation amplitude is $h_{ref}$ and the drive oscillation amplitude measured at time t is $h_{meas}$, then an adjusted value $S_{ADJ}$ (t) for the drive signal amplitude can for example be calculated in a PI-controller with the well-known formula $$S_{ADJ}(t) = K_p(h_{ref} - h_{meas}(t)) + K_i \int_0^t (h_{ref} - h_{meas}(t)) d\tau$$

where $K_p$ and $K_i$ are non-negative coefficients.

The adjustment value can be calculated in other ways as well. The adjustment may be conditional, so that no adjustment is made unless the measured second harmonic amplitude (or the corresponding drive oscillation amplitude) lies outside of a predetermined interval around its reference value.

EXAMPLE 2

Figure 7A:
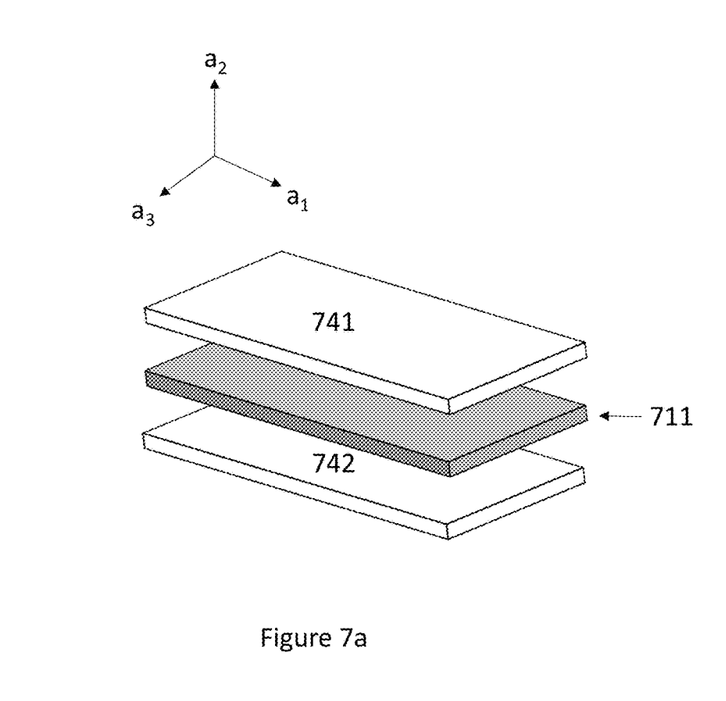
FIGS. 7a-7c illustrate a second exemplary gyroscope.
Figure 7B:
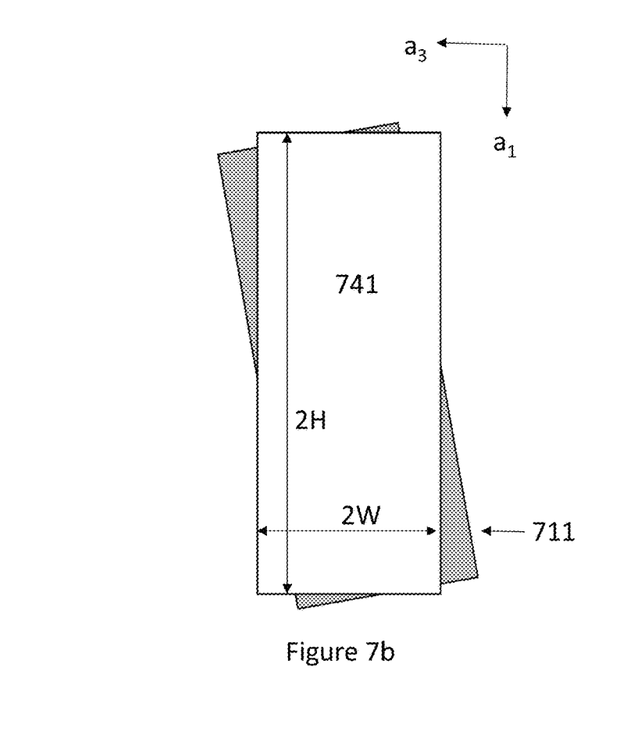

FIGS. 7a-7b illustrate the working principle of a second exemplary gyroscope structure. The gyroscope type is illustrated in FIG. 4, where two mass elements are driven in rotational oscillation. When this gyroscope undergoes angular rotation the Coriolis force actuates a rotation out of the substrate plane, as explained earlier.

This rotation out of the substrate plane can be detected through a differential capacitance measurement utilizing plate-shaped sense electrodes 741 and 742 above and below the mass element 711, as illustrated in FIG. 7a. The surface areas of the electrodes and the mass element have been drawn exactly equal in FIG. 7a, but the apparatus and method of this disclosure can be implemented also with electrode areas smaller or larger than the area of the sense mass.

When the mass element 711 is in drive motion, it rotates back and forth about axis $a_2$. FIG. 7b shows the positions of the top sense electrode 741 and the mass element 711 projected onto the $a_1$-$a_3$ plane. At the moment illustrated in FIG. 7b, the mass element has rotated counter-clockwise. The rotation has been greatly exaggerated in the figure for illustrative purposes. The top sense electrode 741 and the bottom sense electrode 742 remain fixed in their initial positions. It is evident from FIG. 7b that the areal overlap of each sense electrode (741, 742) with the mass element 711 is smaller when the mass element has rotated away from its center position.

The capacitance between each sense electrode 741 and 742 and the mass element 711 is directly proportional to their a real overlap. The grey areas of the mass element 711 visible beneath the top sense electrode 741 in FIG. 7b do not contribute to the capacitance. In other words, the a real overlap varies periodically as the mass element 711 oscillates back and forth about the $a_2$-axis.

The mass element 711 oscillates at the drive oscillation frequency $\omega_D$. The areal overlap oscillation, however, will obtain the second harmonic frequency $2\omega_D$ because the overlap exhibits two minima and two maxima in each period of drive cycle oscillation. One minimum is shown in FIG. 7b where the mass element 711 has rotated to its counter-clockwise extremity. The other minimum will occur when the mass element 711 has rotated to its clockwise extremity (not shown). In other words, the sense electrodes 741 and 742 will completely overlap the mass element 711 twice in each period. The same periodic effect can easily be produced even when the mass element area is not exactly equal to the sense electrode area, as long as there is some change in areal overlap.

The sensed capacitance is of course also determined by the periodic displacement of the mass element 711 about the $a_3$-axis due to the Coriolis Effect. As before, this oscillating change in capacitance exhibits the drive oscillation frequency $\omega_D$. The oscillation induced by the Coriolis Effect and the areal overlap oscillation are easily distinguishable in the sense signal because they exhibit different frequencies.

In this example the amplitude of the areal overlap oscillation signal component is proportional to the amplitude of the drive oscillation. This can be shown as follows.

Figure 7C:
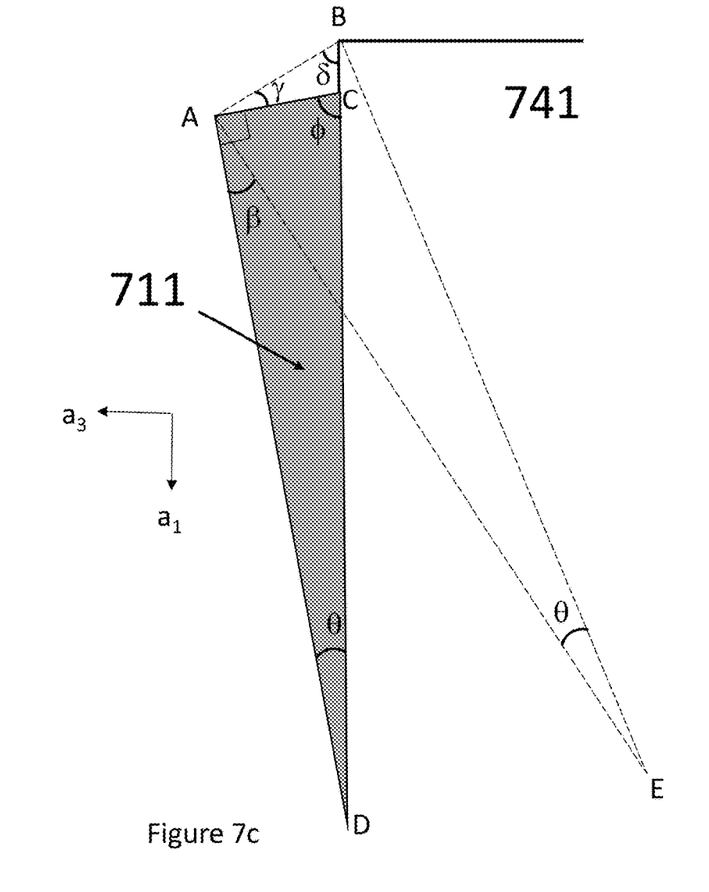

The height of both the sense electrode 741 and the mass element 711 is 2H and their width is 2W as defined in FIG. 7b. FIG. 7c shows the geometry of the upper left hand corner from FIG. 7b in more detail. The important points in the geometry are indicated with the letters A, B, C, D and E. The rotation angle of the mass element is $\theta$, which can be interpreted as the drive oscillation amplitude since the mass element 711 has turned to its counter-clockwise extremity in FIG. 7b.

Since the center point E of mass element 711 remains fixed as it rotates, the line AB forms the base of an isosceles triangle ABE with two sides of length $\sqrt{H^2+W^2}$ and a vertex angle $\theta$. The length $L_{AB}$ of the line AB is therefore $$L_{AB} = 2 \cdot \sqrt{H^2 + W^2} \sin\left(\frac{\theta}{2}\right) \quad (5)$$

When the law of sines is applied to the triangle ABC, it follows that $$\frac{L_{AB}}{\sin(180° - \phi)} = \frac{L_{AC}}{\sin\delta} = \frac{L_{BC}}{\sin\gamma} \quad (6)$$

where $L_{AC}$ is the distance from point A to point C and $L_{BC}$ the distance from B to C. Since $\phi = 90° - \theta$, it follows that sin $(180° - \phi) = \cos \theta$. Furthermore, $\delta = (180° - (90° + \theta) - \gamma) = 90° - \theta - \gamma$ and therefore sin $\delta = \cos(\theta + \gamma)$.

It therefore follows from (6) that $$\frac{L_{AB}}{\cos\theta} = \frac{L_{AC}}{\cos(\theta + \gamma)} \quad (7)$$

Since E is the center point of the sense mass, the angle $\beta = \tan^{-1}$ (W/H). It can be seen from the angles around point A that $\beta$ plus the base angle of the isosceles triangle equals $\gamma$ plus a right angle. In other words, $$\beta + \frac{180° - \theta}{2} = 90° + \gamma \quad (8)$$

In practice, the angle $\theta$ is much smaller than the angle $\beta$ because the drive oscillation rotates the mass element 711 very little. To a good approximation $\gamma \approx \beta$ and equations (5), (7) and (8) can then be combined into $$L_{AC} = 2 \cdot \sqrt{H^2 + W^2} \sin\left(\frac{\theta}{2}\right) \cdot \frac{\cos(\theta + \gamma)}{\cos\theta} = 2 \cdot \sqrt{H^2 + W^2} \sin\left(\frac{\theta}{2}\right) \cdot \frac{\cos\beta}{\cos\theta} \quad (9)$$

Which can be written as $$L_{AC} = 2 \cdot \sqrt{H^2 + W^2} \sin\left(\frac{\theta}{2}\right) \cdot \frac{\frac{H}{\sqrt{H^2+W^2}}}{\cos\theta} = 2H \frac{\sin\frac{\theta}{2}}{\cos\theta} \quad (10)$$

The area of the grey triangle in FIG. 7c can be labelled $A_{ADC}$. It can now be written as a function of θ:

$$A_{ABC}(\theta) = \frac{1}{2} L_{AC} \cdot \frac{L_{AC}}{\tan\theta} = 2H^2 \frac{\left(\sin\frac{\theta}{2}\right)^2}{\tan\theta \cdot (\cos\theta)^2} \quad (11)$$

The angle θ is small, so the function $A_{ABC}(\theta)$ can be approximated by a Taylor series around the point θ=0. This yields the proportional relationship $$A_{ABC}(\theta) \sim \theta \quad (12)$$

The same analysis applies directly to the lower right hand corner of the sense electrode/mass element structure in FIG. 7b. It is also applicable to the upper right hand corner and lower left hand corner of the same the electrode/mass element structure, with one modification: the angle β assumes the value $\tan^{-1}$ (H/W) in these two corners.

It follows that the total change in areal overlap as the mass element 711 turns to its counter-clockwise extremity with an angle θ about the $a_2$-axis is directly proportional to this angle. The measured capacitance is directly proportional to the areal overlap, so it follows that $$\Delta C(\theta) \sim \theta \quad (13)$$

The capacitive sense signal measured from the mass elements will therefore exhibit a periodic component whose amplitude is proportional to the drive oscillation amplitude θ. This amplitude is the second harmonic amplitude.

The exact value of the proportionality coefficient will depend on the dimensions W and H. Furthermore, a second harmonic signal component could be generated with any number of alternative geometries. The sense electrode and mass element areas need not be equal nor symmetric. The electrode and mass element need not have the same center point. The proportionality coefficient can in each case be determined by a person skilled in the art.

The important thing to note is that the second harmonic amplitude of the sense signal can be used to continuously monitor the drive oscillation amplitude θ. Once the second harmonic amplitude has been determined, the corresponding (measured) drive oscillation amplitude can be calculated and the drive signal amplitude can be adjusted in the same manner as in the first exemplary gyroscope above.

The invention claimed is:

1. A microelectromechanical gyroscope comprising at least one mass element, a drive actuator, sense electrodes, and a gyroscope control circuit, wherein—the drive actuator is configured to be controlled by a drive signal comprising a drive signal amplitude and a drive signal frequency,
the at least one mass element is configured to be driven by the drive actuator into a drive oscillation movement with a drive oscillation frequency $\omega_D$, and
the sense electrodes are configured to produce a sense signal from a sense oscillation movement of the at least one mass element, the sense signal including a first component induced by the effect of the Coriolis force on the at least one mass element,
wherein the gyroscope control circuit comprises an amplitude detection unit which detects the effect of the Coriolis force from a sense signal amplitude at the frequency $\omega_D$,
and the sense signal has a second component with a second harmonic frequency $2\omega_D$,
and the gyroscope control circuit comprises a second amplitude detection unit which detects the sense signal amplitude at the second harmonic frequency $2\omega_D$.

2. The microelectromechanical gyroscope according to claim 1, wherein the gyroscope control circuit also comprises an amplitude control unit which adjusts the drive signal amplitude based on the sense signal amplitude detected at the second harmonic frequency $2\omega_D$.

3. The microelectromechanical gyroscope according to claim 2, wherein the amplitude control unit is configured to compare the detected sense signal amplitude to a reference sense signal amplitude.

4. The microelectromechanical gyroscope according to claim 1, wherein the gyroscope control circuit
comprises a phase-locked loop where the sense signal is demodulated at the second harmonic frequency $2\omega_D$, and
comprises a frequency divider which divides the frequency set in the phase-locked loop in half, and
feeds this halved frequency to a signal generator which sets the drive signal frequency to said halved frequency.

5. The microelectromechanical gyroscope according to claim 4, wherein the gyroscope comprises a self-test monitoring unit which outputs a signal indicating self-test failure if either the detected sense signal amplitude, the adjusted drive signal amplitude or the frequency set in the phase-locked loop falls beyond a self-test allowance margin.

6. The microelectromechanical gyroscope according to claim 1, wherein the at least one mass element is surrounded by a reference frame.

7. The microelectromechanical gyroscope according to claim 6, wherein the at least one mass element oscillates within the plane defined by the reference frame.

8. The microelectromechanical gyroscope according to claim 7, wherein the at least one mass element oscillates out of the plane defined by the reference frame.

9. The microelectromechanical gyroscope according to claim 1, wherein the microelectromechanical gyroscope comprises two mass elements and the drive actuator is configured to actuate the at least two mass elements into linear anti-phase oscillation along a primary axis (a1) and the sense oscillation movement of the at least two mass elements occurs along a secondary axis (a3) perpendicular to the primary axis (a1), and the at least two mass elements are physically coupled to each other with two levers, so that the distance between the at least two mass elements in the direction of the secondary axis (a3) exhibits two maxima and two minima in each drive oscillation period.

10. The microelectromechanical gyroscope according to claim 1, wherein the microelectromechanical gyroscope comprises two mass elements and the drive actuator is configured to actuate the at least two mass elements into rotational oscillation about a primary axis (a2), and the sense oscillation of the at least two mass elements occurs about a secondary axis (a3) perpendicular to the primary axis (a2), and the at least two mass elements and the sense electrodes are arranged so that the areal overlap between one of the sense electrodes and one of the at least two mass elements in the direction of the primary axis (a2) exhibits two minima and two maxima in each drive oscillation period.

11. A method for operating a microelectromechanical gyroscope comprising at least one mass element, a gyroscope control circuit, and a drive actuator controlled by a drive signal comprising a drive signal amplitude and a drive signal frequency, wherein
- the at least one mass element is driven by the drive actuator into a drive oscillation movement with a drive oscillation frequency $\omega_D$,
- a sense signal is produced from a sense oscillation movement of the at least one mass element, the sense signal including a first component induced by effect of the Coriolis force on the at least one mass element,
- wherein an amplitude detection unit in the gyroscope control circuit detects the effect of the Coriolis force from a sense signal amplitude at the frequency $\omega_D$,
- the sense signal has a second component with a second harmonic frequency $2\omega_D$,
- the sense signal amplitude is detected at the second harmonic frequency $2\omega_D$ in the gyroscope control circuit,
- and a second amplitude detection unit in the gyroscope control circuit detects the sense signal amplitude at the second harmonic frequency $2\omega_D$.

12. The method according to claim 11, wherein the drive signal amplitude is adjusted based on the sense signal amplitude detected at the second harmonic frequency $2\omega_D$.

13. The method according to claim 12, wherein the sense signal amplitude is compared to a reference sense signal amplitude.

14. The method according to claim 11, wherein
- the sense signal is demodulated at the second harmonic frequency $2\omega_D$ in a phase-locked loop,
- the frequency set in the phase-locked loop is divided in half in a frequency divider, and
- the halved frequency is fed to a signal generator which sets the drive signal frequency to said halved frequency.

15. The method according to claim 14, wherein
- the detected sense signal amplitude is fed to a self-test monitoring unit,
- the adjusted drive signal amplitude is fed to the self-test monitoring unit, and
- the frequency set in the phase-locked loop is fed to the self-test monitoring unit, and
- a signal indicating self-test failure is output by the self-test monitoring unit if the detected sense signal amplitude, the adjusted drive signal amplitude or the frequency set in the phase-locked loop falls beyond a self-test allowance margin.

16. The method according to claim 11, wherein the microelectromechanical gyroscope comprises two mass elements and the drive actuator is configured to actuate the at least two mass elements into linear anti-phase oscillation along a primary axis (a1) and the sense oscillation movement of the at least two mass elements occurs along a secondary axis (a3) perpendicular to the primary axis (a1), and the at least two mass elements are physically coupled to each other with two levers, so that the distance between the at least two mass elements in the direction of the secondary axis (a3) exhibits two maxima and two minima in each drive oscillation period.

17. The method according to claim 11, wherein the microelectromechanical gyroscope comprises two mass elements and the drive actuator is configured to actuate the at least two mass elements into rotational oscillation about a primary axis (a2), and the sense oscillation of the at least two mass elements occurs about a secondary axis (a3) perpendicular to the primary axis (a2), and the at least two mass elements and the sense electrodes are arranged so that the areal overlap between one of the sense electrodes and one of the at least two mass elements in the direction of the primary axis (a2) exhibits two minima and two maxima in each drive oscillation period.

\* \* \* \* \*